US012099126B2

(12) United States Patent
Lin et al.

(10) Patent No.: US 12,099,126 B2
(45) Date of Patent: Sep. 24, 2024

(54) NAVIGATION SATELLITE TIME SYSTEM AND ITS AUTONOMOUS RECOVERY METHOD

(71) Applicants: INNOVATION ACADEMY FOR MICROSATELLITES OF CAS, Shanghai (CN); SHANGHAI ENGINEERING CENTER FOR MICROSATELLITES, Shanghai (CN)

(72) Inventors: Baojun Lin, Shanghai (CN); Wenbin Gong, Shanghai (CN); Xinying Lu, Shanghai (CN); Yuan Shen, Shanghai (CN); Tingting Chen, Shanghai (CN); Qianyi Ren, Shanghai (CN); Yongshan Dai, Shanghai (CN); Zhiyang Yu, Shanghai (CN); Guang Li, Shanghai (CN); Xia Hong, Shanghai (CN); Xiaoli Tian, Shanghai (CN)

(73) Assignees: INNOVATION ACADEMY FOR MICROSATELLITES OF CAS, Shanghai (CN); SHANGHAI ENGINEERING CENTER FOR MICROSATELLITES, Shanghai (CN)

( * ) Notice: Subject to any disclaimer, the term of this patent is extended or adjusted under 35 U.S.C. 154(b) by 430 days.

(21) Appl. No.: 17/762,091

(22) PCT Filed: Oct. 29, 2019

(86) PCT No.: PCT/CN2019/113893
§ 371 (c)(1),
(2) Date: Mar. 21, 2022

(87) PCT Pub. No.: WO2021/081733
PCT Pub. Date: May 6, 2021

(65) Prior Publication Data
US 2022/0342084 A1    Oct. 27, 2022

(51) Int. Cl.
*G01S 19/25*    (2010.01)
(52) U.S. Cl.
CPC ............ *G01S 19/256* (2013.01)
(58) Field of Classification Search
CPC .............. G01S 19/02; G01S 19/256
See application file for complete search history.

(56) References Cited

U.S. PATENT DOCUMENTS

2003/0090413 A1\* 5/2003 Syrjarinne ............ G01S 19/13
342/357.65
2010/0073228 A1\* 3/2010 Smith ................ G01S 19/235
342/357.41
(Continued)

FOREIGN PATENT DOCUMENTS

| CN | 102291169 | 12/2011 |
| CN | 102981402 | 3/2013 |

(Continued)

OTHER PUBLICATIONS

"International Search Report (Form PCT/ISA/210) of PCT/CN2019/113893", mailed on Aug. 5, 2020, with English translation thereof, pp. 1-6.

(Continued)

*Primary Examiner* — Nguyen T Vo
(74) *Attorney, Agent, or Firm* — JCIPRNET (57) ABSTRACT

A navigation satellite time system and its autonomous recovery method are provided, including a load time system, the load time system is configured to generate and maintain the load time, and the load time system comprises an space borne atomic clock, a time-frequency processing unit and a plurality of load time backups module, the time information of the load time is obtained from the ground station time; the pulse-per-second signals of the load time are generated and maintained by the space borne atomic clock and the time-frequency processing unit; when the time-frequency pro- (Continued)

cessing unit fails, the first-level recovery state is triggered: the time-frequency processing unit compares the time information and the pulse-per-second signals reversely output by the multiple load time backup modules to perform load time recovery.

13 Claims, 2 Drawing Sheets

(56) References Cited

U.S. PATENT DOCUMENTS

2017/0269231 A1* 9/2017 Dai .................. G01S 19/32
2018/0348376 A1* 12/2018 Derbez ............. G01S 19/23

FOREIGN PATENT DOCUMENTS

| CN | 105301951 | 2/2016 |
| CN | 108540207 | 9/2018 |
| JP | 2007322418 | 12/2007 |

OTHER PUBLICATIONS

"Written Opinion of the International Searching Authority (Form PCT/ISA/237) of PCT/CN2019/113893", mailed on Aug. 5, 2020, pp. 1-4.
Shuai Ping et al., "Studies on Autonomous Navigation Techniques for Navigation Constellations," Engineering Science, vol. 8, Mar. 2006, pp. 22-30.
Che Zhanwu et al., "Research on Key Technologies for Autonomous Time Synchronization for GNSS Navigation Satellite," Geomatic Science and Engineering, vol. 37, Feb. 2017, pp. 72-78.

* cited by examiner

NAVIGATION SATELLITE TIME SYSTEM AND ITS AUTONOMOUS RECOVERY METHOD

CROSS-REFERENCE TO RELATED APPLICATION

This application is a 371 of international application of PCT application serial no. PCT/CN2019/113893, filed on Oct. 29, 2019. The entirety of the above mentioned patent application is hereby incorporated by reference herein and made a part of this specification.

TECHNICAL FIELD

The invention relates to the technical field of satellites, in particular to a navigation satellite time system and its autonomous recovery method.

BACKGROUND TECHNIQUE

With the development of the information age, time information is the basis of almost all operations. Various industries, such as electric power, communications, finance, and information operations, require precise time, timing methods include short-wave/long-wave timing, satellite timing, and network timing, the accuracy of satellite timing is the highest, and the ground receiver receives the timing information of navigation satellites to achieve time unity. In 2017, the U.S. military proposed the concept of "time service war", through more protection and defense work, to improve, maintain, and safeguard time service resources, which further illustrates the importance of the time service function. However, if the navigation satellite itself has timing errors, it will lead to serious service errors. For example, 9 of the 18 satellites in orbit of the European Galileo satellite had atomic clock failures, causing the system to stop running, the Indian IRNSS satellite navigation system had 60% atomic clock failures, and it brought the difficulty of not being able to provide data.

Timing is a key service function of navigation satellites, satellites are facing more and more complex space environments, for example, when subjected to electromagnetic interference, the link between the satellite and the ground operation control system is passively interrupted, so that the satellite cannot recover normal time synchronization function for a long period of time, so that the normal satellite timing service cannot be realized; in order to ensure the stability and reliability of the satellite timing and enhance the survivability of the satellite navigation system, the satellite time system needs to have the functions of autonomous maintenance and recovery. The autonomous maintenance of the satellite time system refers to the autonomous punctuality ability of the satellite without the control of the ground station, many scholars in China and abroad have done a lot of researches, mainly through the time scale algorithm, weighted average algorithm and other methods to establish mathematical models, or the satellite clock parameters can be continuously corrected through inter-satellite bilateral ranging and data exchange. At present, the new generation of BeiDou navigation system has the ability to operate autonomously for 60 days. However, there is less research on the autonomous recovery method of satellite time, especially when the navigation satellite system is outside the country, once a time-frequency related single-machine failure occurs, the time information is completely lost, and instant recovery cannot be performed without a ground station; the time and location information is disordered, and the ground terminal uses the navigation data in this situation, which will cause serious consequences; and it takes several hours to wait for the satellite to arrive in the territory through the ground station to register the signal, and the normal use requirements cannot be met during this period, both military and civilian will have immeasurable impact.

The satellite time system comprises a load time system and a platform time system, during normal space borne operation, the satellite first obtains the reference time information through the ground station, and then the platform time and the load time are synchronized in real-time to maintain the accuracy of the platform time system. The establishment of the load time system includes three aspects: the generation of the reference frequency signal, the distribution of the precise time interval, and the broadcast of the time information. The reference frequency signal is generated by the space borne atomic clock, the GPS/BeiDou and other navigation satellites are equipped with 3 to 4 clocks, one of which is a working atomic clock and the other is a hot standby clock, the precise time interval distribution is completed by the time-frequency processing unit, the broadcast is done by the signal processing unit. At present, the autonomous recovery of satellite time is only designed for the failure of the atomic clock, that is, when the working clock fails, it can switch to the hot standby clock autonomously and seamlessly, the phase jump of the reference frequency after the main and backup switching is better than 20 ps, and the user cannot perceive it. However, in addition to the atomic clock, the time system further comprises a time-frequency processing unit, a signal processing unit, and a platform time system, which lacks an autonomous time recovery method based on a whole satellite. When the satellite is in the autonomous operation mode without the control of the ground station, the abnormality of the time-frequency processing unit will cause the satellite load being restarted to establish the time information, the time information starts from zero and can only wait for the restoration of the time for manual intervention on the ground, at present, there are no satellites time system autonomous fault detection and abnormal recovery mechanism in the project.

Therefore, there is an urgent need for a fast time recovery method, which can quickly recover to the time system before the failure when the satellite is affected by the complex space environment or component failure.

SUMMARY OF THE INVENTION

The purpose of the present invention is to provide a navigation satellite time system and its autonomous recovery method, so as to realize the rapid recovery of the load time under the condition that the satellite is interfered or malfunctioned and the satellite cannot be controlled by the ground, ensure the stability and reliability of the timing function, and improve the survivability of satellite systems.

The purpose of the present invention is also to provide a navigation satellite time system and its autonomous recovery method, so as to realize that the satellite can autonomously and quickly recover time information from the load time backup, the inter-satellite link time or the platform through priority selection, so as to ensure the stability and reliability of the timing function, improving the survivability of satellite systems.

In order to solve the above-mentioned technical problems, the present invention provides a navigation satellite time system, the navigation satellite time system comprises a load time system, the load time system is configured to generate and maintain a load time, and the load time system comprises a space borne atomic clock, a time-frequency processing unit and multiple load time backup modules, wherein:

the time information of the load time is obtained from the ground station time;

the pulse-per-second signals of the load time is generated and maintained by the space borne atomic clock and the time-frequency processing unit;

the time information of the load time backup module is synchronized with the time information of the time-frequency processing unit; and when the time-frequency processing unit fails, a first-level recovery state is triggered, wherein the first-level recovery state includes:

the time-frequency processing unit compares the time information and the pulse-per-second signals reversely output by the multiple load time backup modules, and when the phase of the time information reversely output by two or more load time backup modules in the multiple load time backup modules is consistent with the phase of the pulse-per-second signals, the time information and the second pulse phase are acquired, and the recovery of the load time is performed, wherein the recovery includes:

the time-frequency processing unit adjusts the phase of its own pulse-per-second signals, resets its own time information, and distributes the time information to the load unit.

In an embodiment, in the navigation satellite time system, wherein the load time system further comprises a plurality of load units, and each of the load time backup modules is located in one of the load units;

the pulse-per-second signals of the load time are backed up by the load unit, including:

by the time-frequency processing unit, distributing the pulse-per-second signals and time information of the load time to the load unit; and by the load unit, receiving synchronizing the time information of the load time backup module with the time information of the time-frequency processing unit, and reversely transmitting the time information, and the pulse-per-second signals of the load time backup module to the time-frequency processing unit.

In an embodiment of the navigation satellite time system, wherein the load unit comprises:

an up-link injection receiving unit, which is configured to receive time information of the ground station time;

a signal processing and broadcasting unit, which is configured to broadcast the time information and clock error information of the load time through a navigation message; and an integrity monitoring unit, which is configured to monitor whether the time information and the pulse-per-second signals of the load time are intact and accurate, wherein when the phase of time information and the pulse-per-second signals which is reversely output by any two units in the up-link injection receiving unit, the signal processing and broadcasting unit and the integrity monitoring unit is consistent, the time information and the pulse-per-second signals are acquired to perform the recovery of the load time.

In an embodiment of the navigation satellite time system, wherein the navigation satellite time system is on a satellite which is located in a constellation, and the constellation further comprises other satellites, wherein under normal circumstances, the load time of each satellites in the constellation is consistent, and the load time is the constellation time, and the constellation time is synchronized with the ground station time;

when the time-frequency processing unit fails and cannot enter the first-level recovery state, the second-level recovery state is triggered, and the second-level recovery state includes:

by the navigation satellite time system, obtaining the constellation time as the recovered load time; and by the satellite where the navigation satellite time system is located, performing inter-satellite ranging and data exchange between with other satellites to obtain ranging information, and at the same time, clock difference fitting is performed according to the ranging information before and after the recovery of the load time, and after the calculation of the deviation of the load time, phase correction is performed on the recovered load time.

In an embodiment of the navigation satellite time system according to claim 4, wherein the condition for triggering the second-level recovery state is that neither the time-frequency processing unit nor the load time backup module can generate, maintain or backup correctly time information, and the load time cannot be recovered by means of self-backup.

In an embodiment of the navigation satellite time system according to claim 4, wherein the navigation satellite time system further comprises a platform time system, the platform time system comprises a real-time clock unit module, and the real-time clock unit module is configured to generate and maintain platform time;

the time information of the platform time is obtained from the ground station time;

the real-time clock unit module adjusts the pulse-per-second signals of the platform time according to the pulse-per-second signals of the time-frequency processing unit;

when the time-frequency processing unit fails and cannot enter the first-level recovery state and the second-level recovery state, the third-level recovery state is triggered, and the third-level recovery state includes: the real-time clock unit module triggers an autonomous timekeeping function, wherein the pulse-per-second signals of the platform time is used for autonomous timekeeping;

the time-frequency processing unit reads the second pulse phase and time information of the platform time, makes the load time preliminarily synchronized with it, and completes the phase correction of the pulse-per-second signals of load time according to the steps in the second-level recovery state after the second-level recovery state is triggered;

the time-frequency processing unit sends a correction instruction to the load unit to correct the pulse-per-second signals and time information of the load unit.

In an embodiment of the navigation satellite time system according to claim 6, wherein by the real-time clock unit module, adjusting the pulse-per-second signals of the platform time according to the pulse-per-second signals of the time-frequency processing unit comprises: sending their respective pulse-per-second signal bidirectionally by the platform time system and the time-frequency processing unit, comparing the phase of the pulse-per-second signals of the platform time with the pulse-per-second signals of the load time, and when the phase of the two exceeds the phase threshold value, correcting the phase of the pulse-per-second signals of the platform time; and the third-level recovery state further includes: the time-frequency processing unit sends alarm information to the real-time clock unit module, and the real-time clock unit module stops using the pulse-per-second signals of the load time to compare the pulse-per-second signals of the platform time, and the real-time clock unit module triggers the autonomous timekeeping function.

In an embodiment of the navigation satellite time system according to claim 7, wherein the condition for triggering the third-level recovery state is that the error of the second pulse phase of the load time is greater than 50 microseconds compared with the second pulse phase before the fault, and the navigation satellite time system cannot establish a link with the inter-satellite links of other satellites, and cannot provide the constellation clock difference.

In an embodiment of the navigation satellite time system according to claim 7, wherein the time information includes seconds in a week and a week count.

The present invention also provides a navigation satellite time system, the navigation satellite time system comprises a load time system, the load time system is configured to generate and maintain a load time, and the load time system comprises a space borne atomic clock and a time-frequency processing unit, the time information of the load time is obtained from the ground station time;

the navigation satellite time system is on a satellite which is located in a constellation, and the constellation further comprises other satellites, under normal circumstances, the load time of each satellites in the constellation is consistent, and the load time is the constellation time, and the constellation time is synchronized with the ground station time;

when the time-frequency processing unit fails, the navigation satellite time system obtains the constellation time as the recovered load time, inter-satellite ranging and data exchange are performed between the satellite where the navigation satellite time system is located and other satellites to obtain ranging information, and at the same time, clock difference fitting is performed according to the ranging information before and after the recovery of the load time, and after the calculation of the deviation of the load time, phase correction is performed on the recovered load time.

The present invention also provides a navigation satellite time system, the navigation satellite time system comprises a load time system and platform time system, the load time system is configured to generate and maintain a load time, and the load time system comprises a space borne atomic clock and a time-frequency processing unit, the time information of the load time is obtained from the ground station time;

wherein the platform time system comprises a real-time clock unit module, and the real-time clock unit module is configured to generate and maintain platform time; the time information of the platform time is obtained from the ground station time; the real-time clock unit module adjusts the pulse-per-second signals of the platform time according to the pulse-per-second signals of the time-frequency processing unit;

wherein when the time-frequency processing unit fails, the real-time clock unit module triggers an autonomous timekeeping function, the pulse-per-second signals of the platform time is used for autonomous timekeeping;

wherein the time-frequency processing unit reads the second pulse phase and time information of the platform time as the initial load time, and the time-frequency processing unit performs inter-satellite ranging and data exchange with other satellites in the constellation where it is located to obtain ranging information, and at the same time, clock difference fitting is performed according to the ranging information before and after the obtain of the load time, and after the calculation of the deviation of the load time, phase correction is performed on the initial load time; and wherein the time-frequency processing unit sends a correction instruction to the load unit to correct the pulse-per-second signals and time information of the load unit.

The present invention also provides an autonomous recovery method of a navigation satellite time system, the autonomous recovery method of the navigation satellite time system comprises:

generate and maintain the pulse-per-second signals of the load time;

obtain the time information of the load time from the ground station time;

configure multiple load time backup modules in the load time system, the time information of the load time backup module is synchronized with the time information of the time-frequency processing unit; and when the time-frequency processing unit fails, a first-level recovery state is triggered, wherein the first-level recovery state includes:

the time-frequency processing unit compares the time information and the pulse-per-second signals reversely output by the multiple load time backup modules, and when the phase of the time information reversely output by two or more load time backup modules in the multiple load time backup modules is consistent with the phase of the pulse-per-second signals, the time information and the second pulse phase are acquired to perform the recovery of the load time, the recovery includes:

the time-frequency processing unit adjusts the phase of its own pulse-per-second signals, resets its own time information, and distributes the time information to the load unit.

In an embodiment of the autonomous recovery method of a navigation satellite time system, the autonomous recovery method of the navigation satellite time system further comprises:

when the time-frequency processing unit fails, determining whether the time-frequency processing unit can obtain the time information output by the load time backup module, and if so, triggering the first-level recovery state;

if not, determining whether the inter-satellite link can complete ranging with other satellites, and if so, triggering the second-level recovery state; and if not, the first-level recovery state and the second-level recovery state cannot be entered, and determining whether the time-frequency processing unit can obtain the time information output by the platform time system; if so, triggering the third-level recovery state; if not, then wait for time synchronization with the ground station.

In an embodiment of the method for autonomous recovery of a navigation satellite time system according to claim 13, wherein the second-level recovery state includes: obtaining the constellation time as the recovered load time by the navigation satellite time system; and inter-satellite ranging and data exchange are performed between the satellite where the navigation satellite time system is located and other satellites to obtain ranging information, and at the same time, clock difference fitting is performed according to the ranging information before and after the recovery of the load time, and after the calculation of the deviation of the load time, phase correction is performed on the recovered load time;

wherein the third-level recovery state includes: the real-time clock unit module of the platform time system triggers an autonomous timekeeping function, the pulse-per-second signals of the platform time is used for autonomous timekeeping.

In the navigation satellite time system and its autonomous recovery method provided by the present invention, when the time-frequency processing unit fails, a first-level recovery state is triggered, and the time-frequency processing unit compares the time information and the seconds pulse signal reversely outputted by the multiple load time backup modules, when the phase of the time information and the pulse-per-second signals of two or more load time backup modules is consistent, the time information and pulse-per-second signals are obtained to perform the recovery of the load time, and realize that the clock error information has not changed before and after the fault, and the recovery of time information and pulse-per-second signals can be quickly completed, even in the case of a time-frequency-related single-machine failure and there is no ground station, instant recovery can be performed.

Further, by selectively triggering the first-level recovery state, the second-level recovery state or the third-level recovery state, it can be achieved that in the case of satellite interference or failure and the ground cannot control the satellite, the satellite can automatically and quickly recover the load time from the load time backup module, the inter-satellite link time correction or the real-time clock unit module through priority selection, ensuring the stability and reliability of the timing function, improve the survivability of satellite systems.

In addition, the navigation satellite time system proposed by the present invention uses the load time backup module to solve the time recovery after the failure of the time-frequency processing unit, uses the inter-satellite link bidirectionally ranging calibration to correct the time error, and solves the failure of the load time backup module and the problem that the satellite clock cannot be recovered independently from the "clock jump" error, and the platform autonomous timekeeping is used to solve the problem of the timing disorder of the navigation satellite and the inability to provide services which caused by the failure of the navigation satellite load time backup module and the inter-satellite link, the time recovery strategy is designed from the whole satellite level, according to the priority order of the load time backup module, the inter-satellite link bidirectionally ranging and the platform autonomous timekeeping, the scheme design of the time system recovery is carried out, even if the load unit such as the signal processing unit and the platform time system are damaged, it can be realized the time recovery more reliable.

The present invention also provides the self-recovery of the navigation satellite time system by directly applying the second-level recovery, and does not set up the technical scheme of the first-level recovery, the advantage is that the configuration of the load time backup module in the load time system is omitted, only software improvements are applied for time recovery purposes, saving hardware costs.

The present invention also provides the time recovery of the navigation satellite time system by directly applying the third-level recovery, and does not set up the technical scheme of the first-level recovery and the second-level recovery, the advantage is that the platform can obtain time information from the platform autonomous timekeeping and quickly recover time.

BRIEF DESCRIPTION OF THE SEVERAL VIEWS OF THE DRAWINGS

as shown in the figure: 10-load time system; 11-time-frequency processing unit; 12-14-load time backup module; 21-24-inter-satellite link; 30-platform time system.

DETAILED DESCRIPTION OF THE INVENTION

The navigation satellite time system and its autonomous recovery method proposed by the present invention will be further described in detail below with reference to the accompanying drawings and specific embodiments. The advantages and features of the present invention will become apparent from the following description and claims. It should be noted that, the accompanying drawings are all in a very simplified form and in inaccurate scales, and are only used to facilitate and clearly assist the purpose of explaining the embodiments of the present invention.

In the existing technology of timing, the ground station directly providing timing services to users is subject to the constraints of the number of users, transmission time, accuracy and reliability, for example, the maximum range of long-wave timing is 1,000 kilometers, so there is no way for overseas users to obtain the time of the ground station, in addition, the timing accuracy of the base station is on the order of ms, which cannot meet the needs of high-precision users. For a global system such as Beidou Navigation System, satellite timing is the best choice, so the accuracy, stability and reliability of the time system has become the key.

The establishment of the time system includes the generation of the reference frequency signal, that is, the space borne atomic clock generates the clock signal, and the satellite reference frequency signal is generated by the time-frequency processing unit, which is provided to each load unit; the distribution of precise time intervals, that is, the real-time frequency processing unit generates the pulse-per-second signals frequency after frequency multiplication according to the reference frequency signal, and the precise time interval is generated by counting, which is distributed to all load units, so that all load units (such as up-link injection receiving unit, signal processing and broadcasting unit, integrity monitoring unit, etc.) work at the same time interval; broadcast of time information, that is, the signal processing and broadcast unit broadcasts time information (seconds in a week, week count) and clock error information through navigation messages.

Therefore, time recovery includes recovery of time information and recovery of time intervals. Time information is represented by seconds in a week, week count, and time intervals are represented by pulse-per-second signals (PPS) in per-second intervals. In addition to the above time content, the time of the navigation satellite also includes the clock difference, the clock difference is a deviation of the satellite time from the reference time of the ground station, which is used to assist the ground terminal user to perform positioning calculation. Therefore, in time recovery, the recovery of time information (seconds in a week, week count) and the recovery of time interval (pulse-per-second signals) are the recovery of the satellite time system itself, and the correction of clock error information is used to provide ground users.

The main idea of the present invention is to provide a navigation satellite time system and its autonomous recovery method, so as to realize the rapid recovery of the load time under the condition that the satellite is interfered or malfunctioned and the satellite cannot be controlled by the ground, ensure the stability and reliability of the timing function, and improve the survivability of satellite systems.

In order to realize the above idea, the present invention provides a navigation satellite time system and its autonomous recovery method, the navigation satellite time system comprises a load time system, the load time system is configured to generate and maintain a load time, and the load time system comprises an space borne atomic clock, a time-frequency processing unit and multiple load time backup modules, wherein: the time information of the load time is obtained from the ground station time; the pulse-per-second signals of the load time is generated and maintained by the space borne atomic clock and the time-frequency processing unit; the time information of the load time backup module is synchronized with the time information of the time-frequency processing unit; and when the time-frequency processing unit fails, a first-level recovery state is triggered, wherein the first-level recovery state includes: the time-frequency processing unit compares the time information and the pulse-per-second signals reversely output by the multiple load time backup modules, and when the phase of the time information reversely output by two or more load time backup modules in the multiple load time backup modules is consistent with the phase of the pulse-per-second signals, the time information and the second pulse phase are acquired, and the recovery of the load time is performed, wherein the recovery includes: the time-frequency processing unit adjusts the phase of its own pulse-per-second signals, resets its own time information, and distributes the time information to the load unit.

First Embodiment

Figure 1:
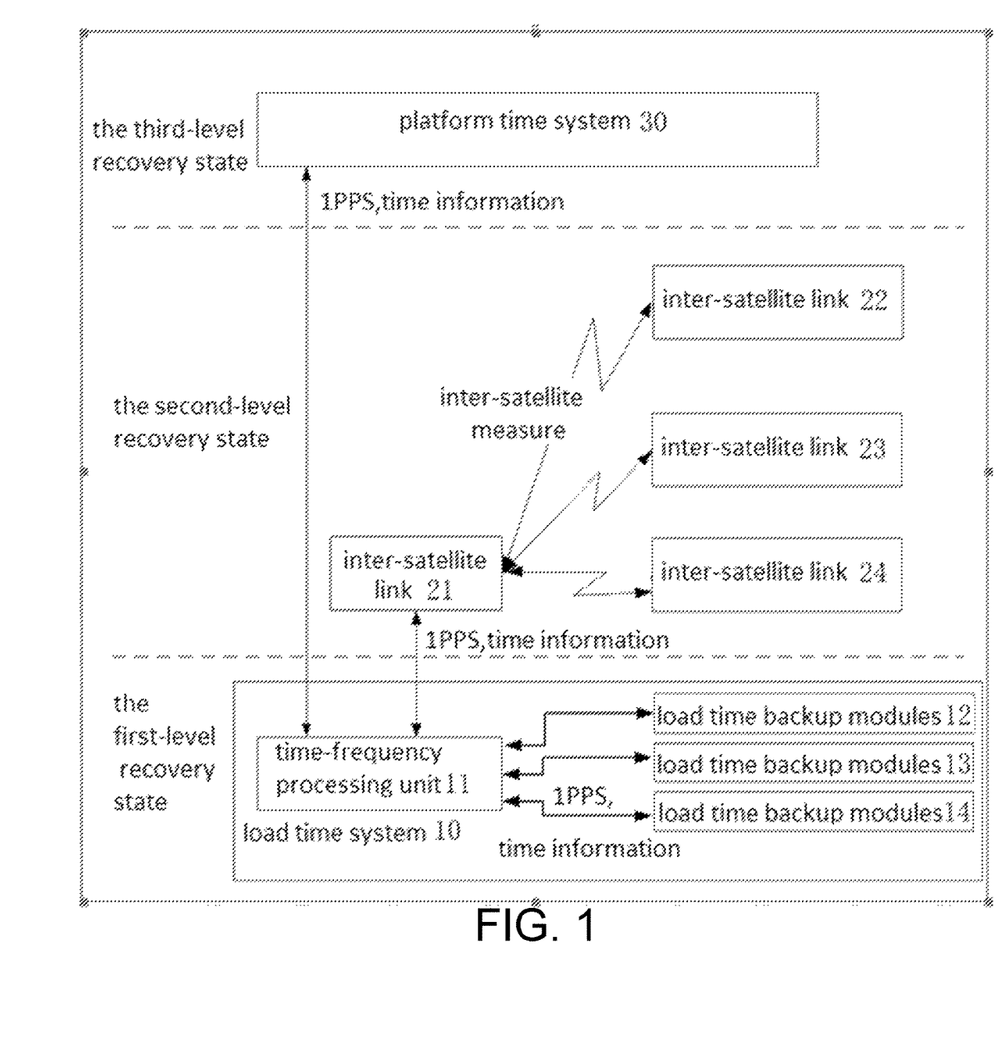
FIG. 1 is a schematic diagram of a grading scheme for autonomous recovery of a navigation satellite time system according to an embodiment of the present invention.

This embodiment provides a navigation satellite time system, as shown in FIG. 1, the navigation satellite time system comprises a load time system 10, the load time system10 is configured to generate and maintain a load time, and the load time system 10 comprises an space borne atomic clock, a time-frequency processing unit 11 and multiple load time backup modules, as shown in FIG. 1, for example, the load time backup module 12, the load time backup module 13, and the load time backup module 14, wherein: the time information of the load time is obtained from the ground station time; the pulse-per-second signals of the load time is generated and maintained by the space borne atomic clock and the time-frequency processing unit 11; the time information of the load time backup module (the load time backup module 12, the load time backup module 13, and the load time backup module 14) is synchronized with the time information of the time-frequency processing unit 11; and when the time-frequency processing unit 11 fails, determine whether the time-frequency processing unit can obtain the (load) time backup module, and if so, trigger the first-level recovery state; wherein the first-level recovery state includes: the time-frequency processing unit 11 compares the time information and the pulse-per-second signals (1 PPS) reversely output by the multiple load time backup modules (the load time backup module 12, the load time backup module 13, and the load time backup module 14), and when the phase of the time information reversely output by two or more load time backup modules in the multiple load time backup modules is consistent with the phase of the pulse-per-second signals, the time information and the second pulse phase are acquired, and the recovery of the load time is performed, wherein the recovery includes: the time-frequency processing unit 11 adjusts the phase of its own pulse-per-second signals, resets its own time information, and distributes the time information to the load unit. The purpose of the first-level recovery is that the clock error information does not change before and after the failure, and the recovery of the time information and the pulse-per-second signals can be quickly completed, and the time recovery can be achieved after the comparison of multiple backup information, which is not affected by a single point of the time-frequency processing unit.

Specifically, in the navigation satellite time system, the load time system further comprises a plurality of load units, and each of the load time backup modules is located in one of the load units, that is, each of the load units has a load time backup module, the pulse-per-second signals of the load time are backed up by the load unit, including: distributing the pulse-per-second signals (1 PPS) and time information of the load time to the load unit by the time-frequency processing unit 11; and the load unit receives, synchronizing the time information of the load time backup module 12,13,14 with the time information of the time-frequency processing unit 11, and transmits the time information and the pulse-per-second signals (1 PPS) of the load time backup module 12,13,14 in reverse to the time-frequency processing unit 11. The load unit comprises an up-link injection receiving unit(including the load time backup module 12), a signal processing and broadcasting unit (including the load time backup module 13) and an integrity monitoring unit (including the load time backup module 14), the up-link injection receiving unit is configured to receive time information of the ground station time; the signal processing and broadcasting unit is configured to broadcast the time information and clock error information of the load time through a navigation message; the integrity monitoring unit is configured to monitor whether the time information and the pulse-per-second signals of the load time are intact and accurate, wherein when the phase of time information and the pulse-per-second signals which is reversely output by any two units in the up-link injection receiving unit, the signal processing and broadcasting unit and the integrity monitoring unit is consistent, the time information and the pulse-per-second signals are acquired to perform the recovery of the load time.

Further, in the described navigation satellite time system, the navigation satellite time system is on a satellite which is located in a constellation, and the constellation further comprises other satellites, wherein under normal circumstances, the load time of each satellites in the constellation is consistent, and the load time is the constellation time, and the constellation time is synchronized with the ground station time; When the time-frequency processing unit 11 fails, determining whether the time-frequency processing unit can obtain the (load) time backup module, and if so, triggering the first-level recovery state; If not, the first-level recovery state cannot be entered, determining whether the inter-satellite link can complete ranging with other satellites (other stars), and if so, triggering the second-level recovery state, the second-level recovery state includes: obtaining the constellation time as the recovered load time by the navigation satellite time system; and inter-satellite ranging and data exchange are performed between the satellite where the navigation satellite time system is located and other satellites to obtain ranging information, As shown in FIG. 1, the inter-satellite link 21 measures the distance to the inter-satellite link 22, the inter-satellite link 23 and the inter-satellite link 24 respectively; and at the same time, clock difference fitting is performed according to the ranging information before and after the recovery of the load time, and after the calculation of the deviation of the load time, phase correction is performed on the recovered load time (1 PPS and the time information). The condition for triggering the second-level recovery state is that neither the time-frequency processing unit 11 nor the load time backup module 12,13,14 can generate, maintain or backup correctly time information, and the load time cannot be recovered by means of self-backup.

Specifically, when the reference frequency undergoes phase hopping, frequency hopping, or the satellite load cannot obtain time information from the time backup module, the satellite constellation time is obtained through the local inter-satellite link. It can be seen from the observation principle of inter-satellite links of navigation satellites that in the networking constellation, two-by-two links are established between satellites to exchange information. If the local satellite appears a time abnormality as an established satellite, in case of the load system is restarted and the link is maintained (the clock difference is controlled within 50 µs), the constellation will first temporarily stop using the data of the local satellite for navigation services, and other satellites will temporarily stop the local satellite ranging value for information exchange, and then start the inter-satellite link satellite clock abnormal recovery mechanism, that is, inter-satellite link of the local satellite establishes inter-satellite link with other satellites (satellite 2, satellite 3, satellite 4, etc.) respectively, carries out inter-satellite ranging and data exchange, obtains the time information of the constellation, uses the space borne clock Kalman filter to predict the satellite clock difference state equation and correct the observation model, independently determine the clock difference and frequency offset of the satellite clock, and send it to the space borne time-frequency processing unit. In the general satellite design, the clock error information is sent to the ground only through the signal broadcasting unit, and waits for the control command of the ground station, in this embodiment, the PPS phase correction is directly performed according to the clock difference estimated before and after the fault, avoiding waiting for the intervention control of the ground station, when the satellite is out of the country or there is no ground control, it can quickly complete the time system failure recovery. It can be seen that neither the first-level recovery nor the second-level recovery needs the control of the ground station.

Figure 2:
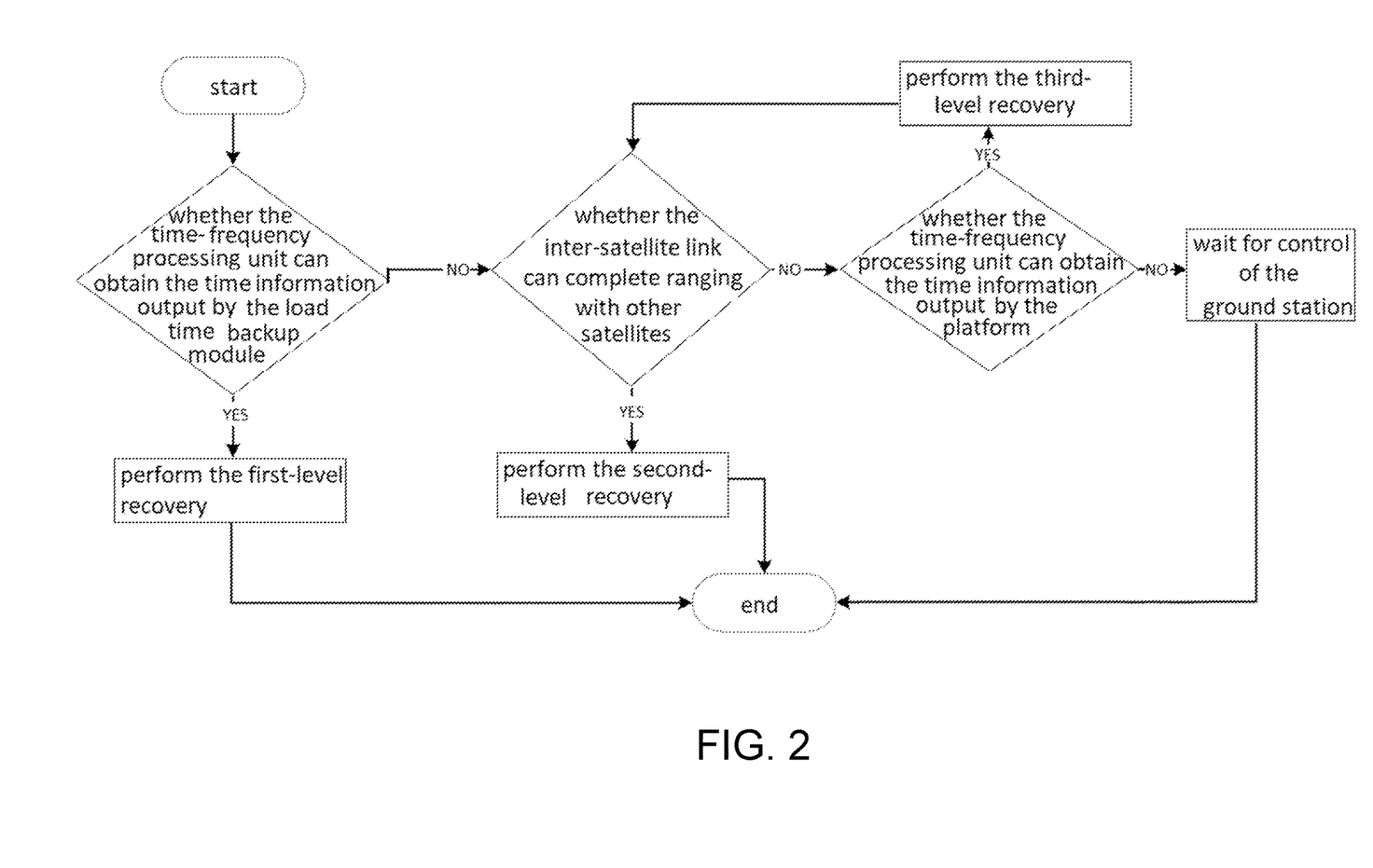
FIG. 2 is a schematic diagram of an autonomous recovery method of a navigation satellite time system according to an embodiment of the present invention.

In addition, In the navigation satellite time system, the navigation satellite time system further comprises a platform time system 30, the platform time system 30 is configured to generate and maintain platform time; the platform time system 30 comprises a real-time clock unit module, and the real-time clock unit module is configured to generate and maintain platform time; the time information of the platform time is obtained from the ground station time; by the real-time clock unit module, adjusting the pulse-per-second signals of the platform time according to the pulse-per-second signals of the time-frequency processing unit 11, comprises: sending their respective pulse-per-second signal (1 PPS) bidirectionally by the platform time system 30 and the time-frequency processing unit 11, comparing the phase of the pulse-per-second signals of the platform time with the pulse-per-second signals of the load time, and when the phase of the two exceeds the phase threshold value, correcting the phase of the pulse-per-second signals of the platform time. As shown in FIG. 2, when the time-frequency processing unit 11 fails, determining whether the time-frequency processing unit can obtain time information output by the (load) time backup module; if so, if so, performing the first-level recovery state; if not, determining whether the inter-link can complete ranging with other satellites (other satellites), if so, performing the second-level recovery; If not, the first-level recovery state and the second-level recovery state cannot be entered, and determining whether the time-frequency processing unit can obtain the time information output by the platform (time system); if so, triggering the third-level recovery state, performing the third-level recovery; if not, then waiting for control of the ground station. The third-level recovery state includes: the time-frequency processing unit 11 sends alarm information to the real-time clock unit module, and the real-time clock unit module stops using the pulse-per-second signals of the load time to compare the pulse-per-second signals (1 PPS) of the platform time, the real-time clock unit module triggers the autonomous timing function, wherein pulse-second signal (1 PPS) of the platform time is used for autonomous timing; the time-frequency processing unit 11 reads the pulse-per-second signals (1 PPS) and time information of the platform time, so that the load time can be initially synchronized with it, and after waiting for the second-level recovery state is triggered, the phase correction of the pulse-per-second signal (1 PPS) of the load time is completed according to the steps in the second-level recovery state; the time-frequency processing unit 11 sends a correction instruction to the load unit to correct the pulse per second signal (1 PPS) and time information of the load unit.

Particularly, in the navigation satellite time system, the condition for triggering the third-level recovery state is that the error of the second pulse phase of the load time is greater than 50 microseconds compared with the second pulse phase before the fault, and the navigation satellite time system cannot establish a link with the inter-satellite links of other satellites, and cannot provide the constellation clock difference. In the navigation satellite time system, the time information includes seconds in a week and a week count.

The satellite time recovery scheme in this embodiment adopts a multi-level recovery strategy, which is divided into load time self-recovery, inter-satellite link time recovery, and platform time recovery in order of priority, corresponding to first-level recovery, second-level recovery and third-level recovery. Time recovery includes recovery of time information (seconds within a week, cycle count), recovery of the pulse-per-second signals (1 PPS), and correction of clock error information.

The satellite time recovery scheme of this embodiment is designed from two perspectives: 1) adding time backup modules 12, 13, and 14 to the load time system 10 as a self-backup, 2) using the platform time as a backup of the load time system 10. A multi-level recovery strategy is adopted, which is divided into load time self-recovery, inter-satellite link time recovery, and platform time recovery in order of priority, corresponding to first-level recovery, second-level recovery and third-level recovery, the recovery plan is shown in FIG. 1. Time recovery includes recovery of time information (seconds within a week, cycle count), recovery of the pulse-per-second signals (PPS), and correction of clock error information.

Second Embodiment

This embodiment further provides a navigation satellite time system, the navigation satellite time system comprises a load time system 10, the load time system 10 is configured to generate and maintain a load time, and the load time system 10 comprises an space borne atomic clock and a time-frequency processing unit 11, the time information of the load time is obtained from the ground station time; the navigation satellite time system is on a satellite which is located in a constellation, and the constellation further comprises other satellites, wherein under normal circumstances, the load time of each satellites in the constellation is consistent, and the load time is the constellation time, and the constellation time is synchronized with the ground station time; when the time-frequency processing unit 11 fails, the navigation satellite time system obtains the constellation time as the recovered load time, inter-satellite ranging and data exchange are performed between the satellite (inter-satellite link 21) where the navigation satellite time system is located and other satellites (inter-satellite link 22~24) to obtain ranging information, and at the same time, clock difference fitting is performed according to the ranging information before and after the recovery of the load time, and after the calculation of the deviation of the load time, phase correction is performed on the recovered load time.

If the above recovery scheme cannot be implemented, the third-level recovery state in the previous embodiment is implemented, including: the platform time system 30 and the time-frequency processing unit 11 send their respective pulse-per-second signal bidirectionally, the phase of the pulse-per-second signals of the platform time compares with the pulse-per-second signals of the load time, when the phase of the two exceeds the phase threshold value, correcting the phase of the pulse-per-second signals of the platform time; when the time-frequency processing unit 11 fails, the time-frequency processing unit sends alarm information to the real-time clock unit module, and the real-time clock unit module stops using the pulse-per-second signals of the load time to compare the pulse-per-second signals of the platform time, and the real-time clock unit module triggers the autonomous timekeeping function, uses the pulse-per-second signals of the platform time for autonomous timekeeping.

Further, the time-frequency processing unit 11 reads the second pulse phase and time information of the platform time as the initial load time, and inter-satellite link 21 performs inter-satellite ranging and data exchange with other satellites in the constellation where it is located to obtain ranging information, and at the same time, clock difference fitting is performed according to the ranging information before and after the obtain of the initial load time, and after the calculation of the deviation of the load time, the deviation of the load time is sent to the time-frequency processing unit 11, the phase correction is performed on the initial load time by the time-frequency processing unit 11; the time-frequency processing unit sends a correction instruction to the load unit to correct the pulse-per-second signals and time information of the load unit.

Compared with the previous embodiment, this embodiment carries out the self-recovery of the navigation satellite time system by directly applying the second-level recovery, and does not set up the technical scheme of the first-level recovery, the advantage of this embodiment is that the configuration of the load time backup module in the load time system is omitted, only software improvements are applied for time recovery purposes, saving hardware costs.

Third Embodiment

This embodiment further provides a navigation satellite time system, the navigation satellite time system further comprises a load time system 10 and a platform time system 30, the load time system is configured to generate and maintain a load time, and the load time system comprises a time-frequency processing unit, the time information of the load time is obtained from the ground station time; the platform time system 30 comprises a real-time clock unit module, and the real-time clock unit module is configured to generate and maintain platform time; the time information of the platform time is obtained from the ground station time; the real-time clock unit module adjusts the pulse-per-second signals of the platform time according to the pulse-per-second signals of the time-frequency processing unit, comprises: sending their respective pulse-per-second signal (1 PPS) bidirectionally by the platform time system 30 and the time-frequency processing unit 11, comparing the phase of the pulse-per-second signals of the platform time with the pulse-per-second signals of the load time, and when the phase of the two exceeds the phase threshold value, correcting the phase of the pulse-per-second signals of the platform time; as shown in picture 2, when the time-frequency processing unit 11 fails, it is judged that, the time-frequency processing unit sends alarm information to the real-time clock unit module, and the real-time clock unit module stops using the pulse-per-second signals of the load time to compare the pulse-per-second signals of the platform time, and the real-time clock unit module triggers the autonomous timekeeping function, uses the pulse-per-second signals of the platform time for autonomous timekeeping.

Further, the time-frequency processing unit reads the second pulse phase and time information of the platform time as the initial load time, inter-satellite link 21 performs inter-satellite ranging and data exchange with other satellites in the constellation where it is located to obtain ranging information, and at the same time, clock difference fitting is performed according to the ranging information before and after the obtain of the initial load time, and after the calculation of the deviation of the load time, the deviation of the load time is sent to the time-frequency processing unit 11, the phase correction is performed on the initial load time by the time-frequency processing unit 11; the time-frequency processing unit sends a correction instruction to the load unit to correct the pulse-per-second signals and time information of the load unit.

Compared with the previous embodiment, this embodiment carries out the time recovery of the navigation satellite time system by directly applying the third-level recovery, and does not set up the technical scheme of the first-level recovery and the second-level recovery, the advantage of this embodiment is that the platform can obtain time information from the platform autonomous timekeeping and quickly recover time.

To sum up, the above embodiments describe in detail the different configurations of the navigation satellite time system. Of course, the present invention includes, but is not limited to, the configurations listed in the above embodiments. The contents of the transformation all belong to the protection scope of the present invention. Those skilled in the art can draw inferences from the contents of the foregoing embodiments.

Fourth Embodiments

The present invention further provides an autonomous recovery method of a navigation satellite time system, the autonomous recovery method of the navigation satellite time system comprises: (the space borne atomic clock and the time-frequency processing unit 11 of the on-board time system 10) generating and maintaining the pulse-per-second signals of the load time; obtaining the time information of the load time from the ground station time; configuring a load time backup modules (12,13,14) in each load system of the load time system 10; distributing the pulse-per-second signals and time information of the load time to the load unit by the time-frequency processing unit 11; receiving by the load unit, synchronizing the time information of the load time backup module (12,13,14) with the time information of the time-frequency processing unit 11, and transmitting the time information and the pulse-per-second signals of the load time backup module (12,13,14) in reverse to the time-frequency processing unit 11, when the time-frequency processing unit 11 fails, a first-level recovery state is triggered, wherein the first-level recovery state includes: the time-frequency processing unit 11 compares the time information and the pulse-per-second signals reversely output by the multiple load time backup modules 12,13,14, and when the phase of the time information reversely output by two or more load time backup modules in the multiple load time backup modules is consistent with the phase of the pulse-per-second signals, the time information and the second pulse phase are acquired to perform the recovery of the load time, the recovery includes: the time-frequency processing unit 11 adjusts the phase of its own pulse-per-second signals, resets its own time information, and distributes the time information to the load unit.

The satellite time recovery scheme in this embodiment adopts a multi-level recovery strategy, which is divided into load time self-recovery, inter-satellite link time recovery, and platform time recovery in order of priority, corresponding to first-level recovery, second-level recovery and third-level recovery. Time recovery includes recovery of time information (seconds within a week, cycle count), recovery of the phase of pulse-per-second signals (PPS), and correction of clock error information.

As shown in FIG. 2, when the time-frequency processing unit 11 fails, determining whether the time-frequency processing unit 11 can obtain time information output by the (load) time backup module 12, 13 or 14; if so, if so, triggering the first-level recovery state; if not, determining whether the inter-link 21 can complete ranging with other satellites (the inter-link 22~24 of other satellites), if so, triggering the second-level recovery state, performing the second-level recovery; and If not, the first-level recovery state and the second-level recovery state cannot be entered, and determining whether the time-frequency processing unit 11 can obtain the time information output by the platform (platform time system 30); if so, triggering the third-level recovery state, perform the third-level recovery; if not, then wait for control of the ground station, waiting for time synchronization with the ground station.

wherein the second-level recovery state includes: obtaining the constellation time as the recovered load time by the navigation satellite time system; and inter-satellite ranging and data exchange are performed between the satellite where the navigation satellite time system is located and other satellites to obtain ranging information, and at the same time, clock difference fitting is performed according to the ranging information before and after the recovery of the load time, and after the calculation of the deviation of the load time, phase correction is performed on the recovered load time; wherein the third-level recovery state includes: the real-time clock unit module of the platform time system triggers an autonomous timekeeping function, the pulse-per-second signals of the platform time is used for autonomous timekeeping.

In the navigation satellite time system and its autonomous recovery method provided by the present invention, when the time-frequency processing unit fails, a first-level recovery state is triggered, and the time-frequency processing unit compares the time information and the seconds Pulse signal reversely outputted by the multiple load time backup modules, complete the recovery of the load time with a strategy of 2 out of 3, and realize that the clock error information has not changed before and after the fault, and the recovery of time information and pulse-per-second signals can be quickly completed, even in the case of a time-frequency-related single-machine failure and there is no ground station, instant recovery can be performed.

Further, by selectively triggering the first-level recovery state, the second-level recovery state or the third-level recovery state, it can be achieved that in the case of satellite interference or failure and the ground cannot control the satellite, the satellite can automatically and quickly recover the load time from the load time backup module, the inter-satellite link time correction or the real-time clock unit module through priority selection, ensuring the stability and reliability of the timing function. improve the survivability of satellite systems.

In addition, the navigation satellite time system proposed by the present invention uses the load time backup module to solve the time recovery after the failure of the time-frequency processing unit, uses the inter-satellite link bidirectionally ranging calibration to correct the time error, and solves the failure of the load time backup module and the problem that the satellite clock cannot be recovered independently from the "clock jump" error, and the platform autonomous timekeeping is used to solve the problem of the timing disorder of the navigation satellite and the inability to provide services which caused by the failure of the navigation satellite load time backup module and the inter-satellite link, the time recovery strategy is designed from the whole satellite level, according to the priority order of the load time backup module, the inter-satellite link bidirectionally ranging and the platform autonomous timekeeping, the scheme design of the time system recovery is carried out, even if the load unit such as the signal processing unit and the platform time system are damaged, it can be realized the time recovery more reliable. Clock jump means that if the phase error of the pulse-per-second signals does not exceed the switching threshold of the atomic clock, it cannot jump from the working clock to the standby clock.

The various embodiments in this specification are described in a progressive manner, and each embodiment focuses on the differences from other embodiments, and the same and similar parts between the various embodiments can be referred to each other. For the system disclosed in the embodiment, since it corresponds to the method disclosed in the embodiment, the description is relatively simple, and the relevant part can be referred to the description of the method.

The above description is only a description of the preferred embodiments of the present invention, and is not intended to limit the scope of the present invention. Any changes and modifications made by those of ordinary skill in the field of the present invention based on the above disclosure all belong to the protection scope of the claims.

What is claimed is:

1. A navigation satellite time system, wherein the navigation satellite time system comprises a load time system, the load time system is configured to generate and maintain a load time, and the load time system comprises a space borne atomic clock, a time-frequency processing unit and multiple load time backup modules, wherein:

a time information of the load time is obtained from a ground station time;

pulse-per-second signals of the load time are generated and maintained by the space borne atomic clock and the time-frequency processing unit;

a time information of the multiple load time backup modules is synchronized with the time information of the time-frequency processing unit; and when the time-frequency processing unit fails, a first-level recovery state is triggered, wherein the first-level recovery state includes:

the time-frequency processing unit compares the time information and the pulse-per-second signals reversely output by the multiple load time backup modules, and when a phase of the time information reversely output by two or more load time backup modules in the multiple load time backup modules is consistent with a phase of the pulse-per-second signals, the time information and a second pulse phase are acquired, and a recovery of the load time is performed, wherein the recovery includes:

the time-frequency processing unit adjusts the phase of its own pulse-per-second signals, resets its own time information, and distributes the time information to a load unit.

2. The navigation satellite time system according to claim 1, wherein the load time system further comprises a plurality of load units, and each of the load time backup modules is located in one of the load units;

the pulse-per-second signals of the load time are backed up by the load unit, including:

by the time-frequency processing unit, distributing the pulse-per-second signals and a time information of the load time to the load unit; and by the load unit, receiving, synchronizing the time information of the multiple load time backup modules with the time information of the time-frequency processing unit, and reversely transmitting the time information and the pulse-per-second signals of the multiple load time backup modules to the time-frequency processing unit.

3. The navigation satellite time system according to claim 2, wherein the load unit comprises:

an up-link injection receiving unit, which is configured to receive a time information of the ground station time;

a signal processing and broadcasting unit, which is configured to broadcast the time information and a clock error information of the load time through a navigation message; and an integrity monitoring unit, which is configured to monitor whether the time information and the pulse-per-second signals of the load time are intact and accurate, wherein when a phase of a time information and pulse-per-second signals which is reversely output by any two units in the up-link injection receiving unit, the signal processing and broadcasting unit and the integrity monitoring unit is consistent, the time information and the pulse-per-second signals are acquired to perform the recovery of the load time.

4. The navigation satellite time system according to claim 1, wherein the navigation satellite time system is on a satellite which is located in a constellation, and the constellation further comprises other satellites, wherein under normal circumstances, the load time of each satellites in the constellation is consistent, and the load time is a constellation time, and the constellation time is synchronized with the ground station time;

when the time-frequency processing unit fails and cannot enter the first-level recovery state, a second-level recovery state is triggered, and the second-level recovery state includes:

by the navigation satellite time system, obtaining the constellation time as a recovered load time; and by the satellite where the navigation satellite time system is located, performing inter-satellite ranging and data exchange between with the other satellites to obtain a ranging information, and at the same time, performing clock difference fitting according to the ranging information before and after the recovery of the load time, and after a calculation of a deviation of the load time, performing phase correction on the recovered load time.

5. The navigation satellite time system according to claim 4, wherein a condition for triggering the second-level recovery state is that neither the time-frequency processing unit nor the multiple load time backup modules can generate, maintain or backup correctly the time information, and the load time cannot be recovered by means of self-backup.

6. The navigation satellite time system according to claim 4, wherein the navigation satellite time system further comprises a platform time system, the platform time system comprises a real-time clock unit module, and the real-time clock unit module is configured to generate and maintain platform time;

a time information of the platform time is obtained from the ground station time;

the real-time clock unit module adjusts pulse-per-second signals of the platform time according to pulse-per-second signals of the time-frequency processing unit;

when the time-frequency processing unit fails and cannot enter the first-level recovery state and the second-level recovery state, a third-level recovery state is triggered, and the third-level recovery state includes: the real-time clock unit module triggers an autonomous timekeeping function, wherein the pulse-per-second signals of the platform time is used for autonomous timekeeping;

the time-frequency processing unit reads the pulse phase and the time information of the platform time, makes the load time preliminarily synchronized with it, and completes the phase correction of the pulse-per-second signals of the load time according to the steps in the second-level recovery state after the second-level recovery state is triggered;

the time-frequency processing unit sends a correction instruction to the load unit to correct the pulse-per-second signals and the time information of the load unit.

7. The navigation satellite time system according to claim 6, wherein by the real-time clock unit module, adjusting the pulse-per-second signals of the platform time according to pulse-per-second signals of the time-frequency processing unit comprises: sending their respective pulse-per-second signals bidirectionally by the platform time system and the time-frequency processing unit, comparing the phase of the pulse-per-second signal of the platform time with the pulse-per-second signal of the load time, and when a phase of the two exceeds the phase threshold value, correcting the phase of the pulse-per-second signals of the platform time; and the third-level recovery state further includes: the time-frequency processing unit sends alarm information to the real-time clock unit module, and the real-time clock unit module stops using the pulse-per-second signal of the load time to compare the pulse-per-second signal of the platform time, and the real-time clock unit module triggers the autonomous timekeeping function.

8. The navigation satellite time system according to claim 7, wherein a condition for triggering the third-level recovery state is that an error of the second pulse phase of the load time is greater than 50 microseconds compared with the second pulse phase before a fault, and the navigation satellite time system cannot establish a link with inter-satellite links of the other satellites, and cannot provide a constellation clock difference.

9. The navigation satellite time system according to claim 7, wherein the time information includes seconds in a week and a week count.

10. A navigation satellite time system, wherein the navigation satellite time system comprises a load time system, the load time system is configured to generate and maintain a load time, and the load time system comprises a space borne atomic clock and a time-frequency processing unit, the time information of the load time is obtained from a ground station time;
the navigation satellite time system is on a satellite which is located in a constellation, and the constellation further comprises other satellites, under normal circumstances, the load time of each of the satellites in the constellation is consistent, and the load time is a constellation time, and the constellation time is synchronized with the ground station time;
when the time-frequency processing unit fails, the navigation satellite time system obtains the constellation time as a recovered load time, inter-satellite ranging and data exchange are performed between the satellite where the navigation satellite time system is located and the other satellites to obtain a ranging information, and at the same time, clock difference fitting is performed according to the ranging information before and after the recovery of the load time, and after a calculation of a deviation of the load time, a phase correction is performed on the recovered load time.

11. An autonomous recovery method of a navigation satellite time system, wherein the autonomous recovery method of the navigation satellite time system comprises:
generating and maintaining pulse-per-second signals of a load time;
obtaining a time information of the load time from a ground station time;
configuring multiple load time backup modules in a load time system, a time information of the multiple load time backup modules is synchronized with a time information of a time-frequency processing unit; and
when the time-frequency processing unit fails, a first-level recovery state is triggered, wherein the first-level recovery state includes:

the time-frequency processing unit compares the time information and pulse-per-second signals reversely output by the multiple load time backup modules, and when a phase of the time information reversely output by two or more load time backup modules in the multiple load time backup modules is consistent with a phase of the pulse-per-second signals, the time information and a second pulse phase are acquired to perform a recovery of the load time, the recovery includes:
the time-frequency processing unit adjusts a phase of its own pulse-per-second signals, resets its own time information, and distributes the time information to a load unit.

12. The autonomous recovery method of the navigation satellite time system according to claim 11, wherein the autonomous recovery method of the navigation satellite time system further comprises:
when the time-frequency processing unit fails, determining whether the time-frequency processing unit can obtain the time information output by the multiple load time backup modules, and if so, triggering the first-level recovery state;
if not, determining whether an inter-satellite link can complete ranging with other satellites, and if so, trigger a second-level recovery state; and
if not, the first-level recovery state and the second-level recovery state cannot be entered, and determining whether the time-frequency processing unit can obtain the time information output by the platform time system; if so, triggering a third-level recovery state; if not, then wait for time synchronization with a ground station.

13. The method for autonomous recovery of the navigation satellite time system according to claim 12, wherein the second-level recovery state includes: by the navigation satellite time system, obtaining a constellation time as a recovered load time; and by a satellite where the navigation satellite time system is located, performing inter-satellite ranging and data exchange with the other satellites to obtain a ranging information, and at the same time, performing clock difference fitting according to the ranging information before and after the recovery of the load time, and after a calculation of a deviation of the load time, performing phase correction on the recovered load time;
wherein the third-level recovery state includes: a real-time clock unit module of the platform time system triggers an autonomous timekeeping function, pulse-per-second signals of a platform time is used for autonomous timekeeping.

* * * * *